Nov. 11, 1941.            C. A. WATKINS                    2,262,596
                      TIRE REGROOVING DEVICE
                      Filed Dec. 30, 1939              2 Sheets-Sheet 1
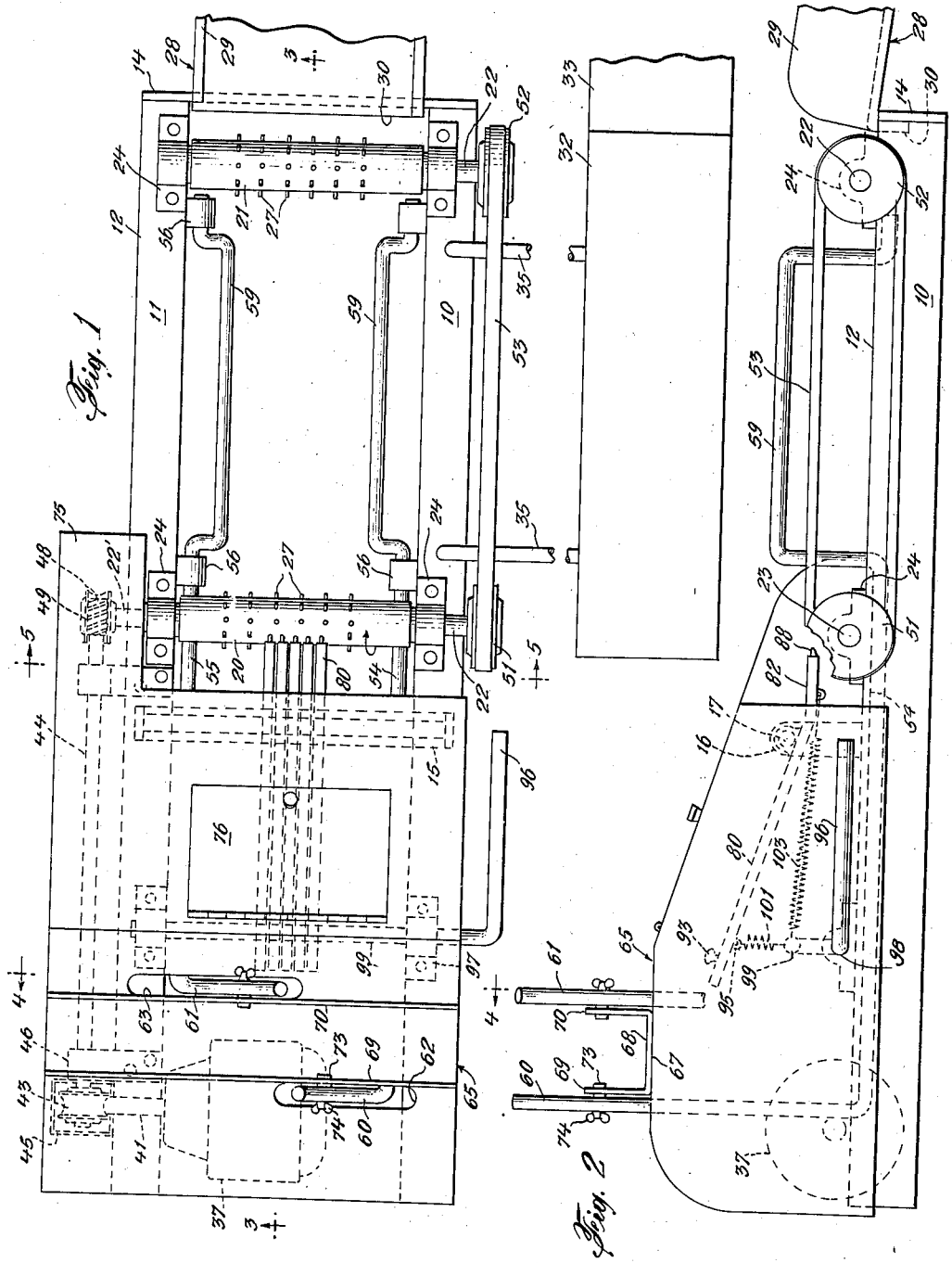
INVENTOR
CLARENCE A. WATKINS
BY John P. Chandler
his ATTORNEY Nov. 11, 1941.   C. A. WATKINS   2,262,596
TIRE REGROOVING DEVICE
Filed Dec. 30, 1939   2 Sheets-Sheet 2
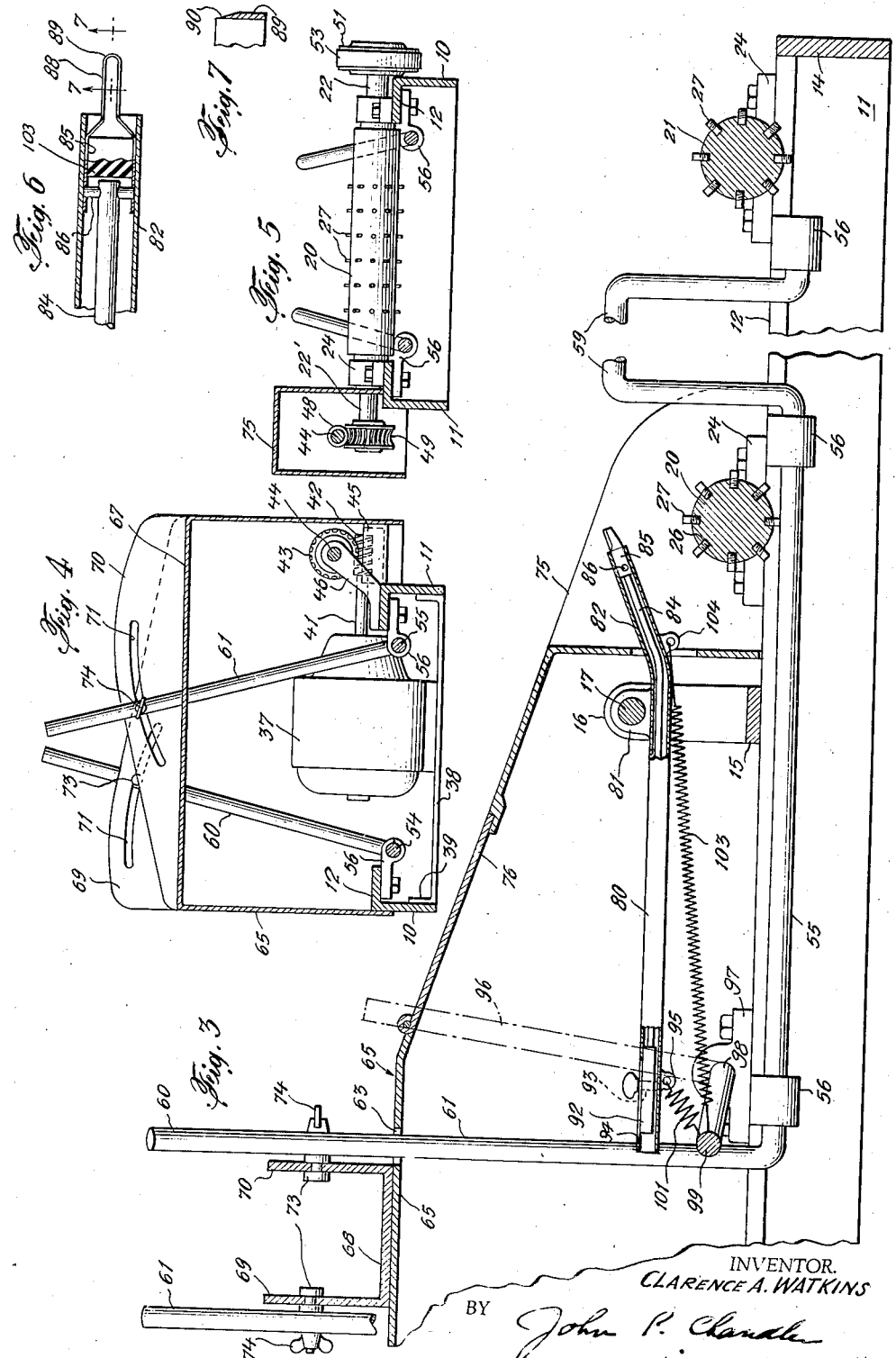
INVENTOR.
CLARENCE A. WATKINS
BY John P. Chandler
his ATTORNEY.

Patented Nov. 11, 1941

2,262,596

UNITED STATES PATENT OFFICE 2,262,596

TIRE REGROOVING DEVICE

Clarence A. Watkins, Forest Hills, N. Y.

Application December 30, 1939, Serial No. 311,914

6 Claims. (Cl. 82—4)

This invention relates to new and useful improvements in tire regrooving machines and relates more particularly to an improved device of this general character which is adapted to quickly and easily cut a new groove or plurality of grooves in a tire after the original grooves have been completely or partially obliterated by wear, the operation being carried on without removing the tire from the wheel upon which it is carried or removing the wheel from the car.

Devices of this general character have been used, but they have been unsatisfactory for the reason that in most instances a relatively high order of skill was required to operate them in an effective manner and the results were far from uniform. It is one of the principal objects of the present invention to provide an improved device of this type wherein the wheel carrying the tire may be easily and quickly moved into position for the operation of regrooving the tire and wherein the operation itself can be accomplished in a minute or thereabouts, thereby greatly reducing the time in which the vehicle is out of commission.

Another object of the invention is the provision of an improved apparatus wherein the cutting element adapts itself for cutting grooves in tires of varying sizes without adjustment of parts.

A further object of the invention is the provision of a device of this character wherein the cutting element cuts a groove of predetermined depth regardless of the irregularities in the surface of the tire.

A still further object of the invention is to provide a device having cutting members which may be readily sharpened or changed when broken and which may be otherwise varied to fit the needs of the user.

A further object of the invention is the provision in a device of this type of means for firmly supporting the side walls of the tire as the same rotates during the groove cutting.

In the drawings:

Fig. 1 is a top plan view of the presently preferred embodiment of the invention;

Fig. 2 is a side elevation thereof;

Fig. 3 is a broken longitudinal, vertical section taken through substantially the center of the device;

Fig. 4 is a transverse vertical section taken on line 4—4 of Fig. 1;

Fig. 5 is a transverse vertical section taken on line 5—5 of Fig. 1;

Fig. 6 is an enlarged, broken, horizontal section taken through one of the cutting elements and the support therefor;

Fig. 7 is a broken, transverse section taken on line 7—7 of Fig. 6.

The present embodiment is mounted on a frame comprising a pair of spaced longitudinal frame members 10 and 11 which are desirably formed from angle irons, the upper or horizontal surfaces 12 thereof supporting various portions of the apparatus. These longitudinal frame members 10 and 11 are held in their spaced relation at their forward ends by means of a flat, elongated bar 14 which is welded or otherwise suitably secured to such front terminals. The frame members are further secured in their spaced position by means of a substantially U-shaped member having an elongated horizontal portion 15 (Fig. 3) and a pair of spaced upstanding journal portions 16 which support a transverse shaft 17, which provides a support for the cutting elements hereinafter described.

The tire of the wheel to be retreaded is supported on a pair of spaced rotatable rollers 20 and 21, each of such rollers being formed with terminal shaft portions 22 and 22' which are journalled in bearing members 24 which are secured to the horizontal portions 12 of frame members 10 and 11. The wheel carrying the tire to be regrooved is rotated by means of these rollers 20 and 21 to which rotative movement is imparted, as will be described hereinafter. Accordingly, it is desired that the surfaces of the rollers 20 and 21 be rendered non-smooth in any suitable fashion. In the form shown, the surfaces of these rollers are provided with a plurality of spaced apertures 26 in which short pins 27 are secured (see Fig. 3). In order to enable the car to be easily driven onto the rollers 20 and 21, a short runway 28 having opposed side walls 29 is provided, the rearward end of such runway having a transverse, downwardly depending flange portion 30 which is supported on the cross-piece 14. This runway may, of course, be removed when the device is not in use.

In some instances it may be desired to have the opposite wheel of the car on substantially the same elevation as the wheel to be regrooved and in order to provide a support for such opposite wheel, a suitable platform 32 of proper height is formed, such platform having an inclined forward portion 33 up which such opposite wheel may travel. This platform may be constructed in any suitable manner and no details of such construction are herein illustrated. In order to provide proper spacing of this platform relative to frame members 10 and 11, a pair of spaced rods 35 carried by such platform pass through suitable apertures (not shown) in frame member 10 (Fig. 1). A motor 37 is mounted on a cross bar 38, the terminals 39 of which are secured to the rearward portion of frame members 10 and 11, as shown in Fig. 4. The shaft 41 of this motor carries a worm drive 42 which engages a worm gear 43 carried on a longitudinally disposed shaft 44. The worm drive 42 is lubricated by oil (not shown) contained in a lubrication box 45. This shaft 44 is supported for rotative movement by means of journal member 46 and carries at its opposite end a worm drive 48 which engages a worm gear 49 carried by shaft 22'. The arrangement of the worm drives 42 and 48 is such as to cause the shaft 23 to rotate much more slowly than shaft 41 driven by the motor, and in the arrangement shown, the roller 20 driven by shaft 22' is of such size as to rotate sufficiently rapidly to turn the wheel carrying the tire approximately one revolution per minute. The opposite terminal shaft portions 22 on rollers 20 and 21, respectively, are provided with belt pulleys 51 and 52, and a belt 53 extending between such pulleys, thereby imparting similar rotative movement to drum 21.

The following means are provided for guiding the side walls of the tire during rotative movement thereof. Shafts 54 and 55 pivotally supported in journals 56 mounted on the under side of horizontal portions 12 of frames 10, are provided with off-set substantially U-shaped portions 59. Shaft 54 is formed with an elongated crank portion 60 and shaft 55 is provided with an elongated crank portion 61, which crank portions pass upwardly through apertures 62 and 63, respectively, in housing member 65.

The upper or horizontal surface 67 of housing 65 supports a substantially U-shaped member 68 having vertical portions 69 and 70. Each of the latter portions are provided with elongated curved slots 71 (Fig. 4) and the crank portions 60 and 61 of shafts 54 and 55, respectively, are secured immovable in their desired position by means of bolts 73 carried in such slots, such bolts passing through apertures (not shown) in the crank portions. Wing nuts 74 carried at the opposite ends of bolts 73 may be tightened when the cranks are properly positioned. Thus it will be apparent that after tire is in place on the rollers 20 and 21, the cranks 60 and 61 are moved in opposite directions to a point wherein U-shaped portions 59, engage the side walls of the tires sufficiently to prevent lateral movement thereof during rotation, and still not so tightly as to prevent free rotation thereof. Wing nuts 74 are now tightened.

Casing 65 is formed with a forward extension 75 on one side thereof which houses the forward end of shaft 44 and its associated gears. The casing is further provided with a hinged cover 76 to permit access to the inside thereof.

The number of grooves to be cut is a matter of choice and the cutting elements may be changed as desired. Each element comprises a cutter support comprising a square tube 80 provided with a bearing member 81 which is pivotally carried on transverse shaft 17 previously described. The tube is provided with an offset portion 82 at its forward end and a control rod 84 is mounted within the tube. The cutting member 85 is mounted on the forward end of this rod by means of a pin 86 (Fig. 6) such cutter being preferably made from flat sheet metal and having a substantially U-shaped forward end portion 88, the transverse portion 89 thereof being rounded and sharpened on its upper edge. This sharpening is preferably done on the exterior of the cutter only, as shown at 90 (Fig. 7).

At its rear end the rod 84 carries a block 92, a set screw 93 passing therethrough and also residing in a longitudinal slot 94 in the upper surface of the tube. Thus it will be apparent that longitudinal adjustment of the cutter may be obtained by loosening set screw 93 and moving rod 84.

When the tire to be regrooved is moved into position on the rollers 20 and 21, it is desirable to lower the cutters to the position shown in Fig. 2 and when the tire is rotating during the regrooving operation, the cutter must yieldingly engage the tire. To accomplish the latter result, a relatively strong compression spring 101 is connected at its upper end to a ring portion 95 carried on the lower surface of tube 80 and at its lower end to a central offset or crank portion 99 of a transverse shaft 98 journalled at 97 between the frame members 10 and 11. A longer and somewhat weaker coil spring 103 is also connected, at one end thereof, with offset portion 99 and at its opposite end it is connected with a ring portion 104 on tube extension 82 beyond shaft 17. A crank portion 96 is formed at one end of shaft 98 and when this portion is horizontal as shown in Fig. 2, the offset portion 99 is vertical, thus releasing the tension in spring 101 and in this position there is sufficient tension in spring 103 to maintain forward portion 82 of tube 80 in horizontal position and the opposite end elevated. After the tire to be regrooved is placed upon the rollers 20 and 21, however, crank 96 is drawn upwardly to the position shown in broken lines in Fig. 3, in which position spring 101 is under tension, thus forcing the cutter into yielding engagement with the tire.

The spaced terminal portions of the cutter 85 are desirably maintained in their spaced position by means of a small block 103 of rubber or other resilient material and in the event that the cutting edge strikes a nail or other hard material, it may move to one side or the other and again spring back into place due to action of this block.

It will be apparent that many changes may be made herein without departing from the spirit of the invention. For instance, other tire side wall engaging means may be provided for preventing lateral movement of the tire, or if desired free lateral movement of the cutters may be provided and means engaging the side walls of the tire cause the cutter to follow lateral movement of the tire. Also, means other than the tube 80 may be provided for supporting the cutters.

What I claim is:

1. A tire regrooving device comprising a frame means, means on the frame for supporting a tire and imparting rotation thereto, such means comprising a plurality of spaced rollers provided with a non-smooth outer surface and means comprising a prime mover for turning such rollers, means for holding the tire against lateral movement during rotation, a plurality of spaced cutters having substantially U-shaped cutting edges, spring means for urging said cutters against the tire and means for controlling the depth of the cut of each cutter comprising a support beyond which the cutter projects, the cutter being adjustable relative to the support.

2. A tire regrooving device comprising a frame means, means on the frame for supporting a tire and imparting rotation thereto, such means comprising a plurality of spaced rollers provided with a non-smooth outer surface and means comprising a prime mover for turning such rollers, means for holding the tire against lateral movement during rotation comprising an elongated shaft on each side of the frame member, each shaft having a substantially U-shaped offset portion adapted to engage the side walls of the tire and means for retaining said offset portion in such engagement, a plurality of spaced cutters having cutting edges lying on a plane substantially radially disposed relative to the tire, means for urging said cutters against the tire and means for controlling the depth of the cut of each cutter comprising a support from which the cutter projects, the cutter being adjustable relative to the support.

3. A tire regrooving device comprising a substantially rectangular frame member, a pair of spaced rollers mounted transversely of said frame members and adapted to receive a tire thereon and impart rotative movement thereto, and a plurality of cutting elements adapted to yieldingly engage the tread portion of the tire during rotation thereof, each of such elements comprising an elongated tube, a pivoted support for the tube, a longitudinally movable cutting member positioned at the forward end of said tube and projecting therefrom, and means for adjusting the position of the cutter relative to the tube and a spring associated with the rear end of the tube adapted to urge the cutter and its support against the tire.

4. A tire regrooving device comprising a frame, a pair of spaced rollers mounted transversely of said frame and adapted to receive a tire thereon and impart rotative movement thereto, a pair of spaced, adjustable tire engaging members mounted on the frame and adapted to firmly engage the side walls of the tire during rotative movement thereof, a plurality of pivotally mounted cutters adapted to yieldingly engage the tread portion of the tire during rotation thereof, and a support for each cutter comprising an elongated tube from which the cutter projects a predetermined distance depending upon the depth of the cut.

5. A tire regrooving device comprising a frame member, a pair of spaced non-smooth rollers mounted transversely of said frame member and adapted to receive a tire thereon and impart rotative movement thereto, means for imparting rotative movement to the rollers comprising a prime mover, a pair of spaced pivotally mounted tire engaging members on the frame and adapted to firmly engage the side walls of the tire during rotative movement thereof, and a plurality of pivotally mounted cutting elements adapted to yieldingly engage the tread portion of the tire during rotation thereof, each of such elements comprising an elongated tube, a longitudinally movable substantially U-shaped cutter in the forward end of said tube and extending therefrom and means within the tube for adjusting the position of the cutter relative to the tube, and means for urging the cutter and its support against the tire.

6. A tire regrooving device comprising a substantially rectangular frame member, a pair of spaced rollers mounted transversely of said frame member and adapted to receive a tire thereon and impart rotative movement thereto, means for imparting rotative movement to the rollers comprising a motor mounted at one end of the frame and gearing connecting the motor with the rollers, a pair of spaced longitudinally disposed tire engaging members mounted on the frame and adapted to firmly engage the side walls of the tire during rotative movement thereof, and a plurality of pivotally mounted cutting elements adapted to yieldingly engage the tread portion of the tire during rotation thereof, each of such elements comprising an elongated tube, a longitudinally movable cutting member positioned at the forward end of said tube and a control rod within the tube and secured to the cutter at its forward end, means for adjusting the position of the rod relative to the tube and a spring associated with the rear end of the tube adapted to urge the cutter and its support against the tire.

CLARENCE A. WATKINS.